United States Patent [19]
Midas et al.

[11] Patent Number: 5,285,137
[45] Date of Patent: Feb. 8, 1994

[54] USER SELECTED CONTROLLER FOR A WINDOW OPERATOR

[75] Inventors: Thomas J. Midas; Scott D. McMillan, both of Owatonna, Minn.

[73] Assignee: Truth Division of SPX Corporation, Owatonna, Minn.

[21] Appl. No.: 753,186

[22] Filed: Aug. 30, 1991

[51] Int. Cl.$^5$ .............................................. H02P 7/00
[52] U.S. Cl. ........................................ 318/280; 318/483
[58] Field of Search ........................... 318/280–288, 318/266, 265, 466–470, 483; 49/26, 28, 118, 141; 160/29, 135, 293.1, 310, 311; 296/216, 223; 307/10.1–10.9, 9.1

[56] References Cited

U.S. PATENT DOCUMENTS

| | | | |
|---|---|---|---|
| 4,234,833 | 11/1980 | Barrett | 318/282 |
| 4,328,451 | 5/1982 | Barge | 318/266 X |
| 4,529,920 | 7/1985 | Yoshida et al. | 318/466 |
| 4,563,625 | 1/1986 | Kornbrekke et al. | 318/283 X |
| 4,673,848 | 6/1987 | Hagiwara et al. | 318/266 |
| 4,706,194 | 11/1987 | Webb et al. | 318/466 |
| 4,713,591 | 12/1987 | McCloskey | 318/282 X |
| 4,730,152 | 3/1988 | Foust et al. | 318/266 X |
| 4,852,469 | 8/1989 | Chuang | 318/266 X |
| 4,870,333 | 9/1989 | Itoh et al. | 318/286 |
| 4,876,649 | 10/1989 | Kawai et al. | 307/10.2 |
| 4,933,613 | 6/1990 | Berner et al. | 318/266 |

*Primary Examiner*—Jonathan Wysocki
*Attorney, Agent, or Firm*—Wood, Phillips, VanSanten, Hoffman & Ertel

[57] ABSTRACT

A skylight operator includes a chain drive driven by a motor. Polarity of power applied to the motor is controlled to selectively open or close the window. Polarity is controlled by an H-bridge switching circuit driven by a microcontroller. The microcontroller receives commands from any one of a plurality of control devices The operator includes a feedback circuit using a hall effect sensor in connection with a ring magnet on the motor shaft for sensing incremental movement of the motor, representing movement of the window. A potentiometer control device allows unattended full or partial opening of the window. A user need only turn the potentiometer knob to a desired amount of opening. The microcontroller in response to such a command compares the command to the feedback signal and controls the motor to minimize the difference between the two.

5 Claims, 7 Drawing Sheets

USER SELECTED CONTROLLER FOR A WINDOW OPERATOR

FIELD OF THE INVENTION

This invention relates to a window operator and, more particularly, to an improved control therefor.

BACKGROUND OF THE INVENTION

Known window units, such as a skylight window, utilize a power unit which can cause extension and retraction of a chain connected to a movable sash of the window for causing opening and closing movement of the window sash. Window operators for skylight windows are know in the art. An example of such a window operator is shown in Tacheny et al. U.S. Pat. No. 4,521,993, owned by the assignee of this application, and the disclosure of which is hereby incorporated by reference herein. This window operator has a chain storable within a housing with the chain being extended from and retracted into the housing by means of a rotatable drive sprocket having a toothed relation with the chain.

The Tacheny et al. patent discloses a two-part housing with a housing base providing for chain storage, chain guiding, and rotatable mounting of the drive sprocket. An upper part of the housing mounts means for driving the rotatable drive sprocket which can either be a manually operable means or a motor drive, as shown in FIG. 5 of the patent. An alternative motor drive is illustrated in Berner et al. U.S. Pat. No. 4,945,678, owned by the assignee of this application, and the disclosure of which is hereby incorporated by reference herein.

Prior motorized window operators used manually operated switches to command energization of power to the motor to open or close the window. However, such operators require that the user continue to actuate the switch until the window opens or closes to the desired position. Alternatively, the control moves the window to a full open or full closed position and limit switches provided deenergization of power to the motor at the end of the stroke. This requires that additional hardware be added to either the operator itself or to the window.

In certain applications, a plurality of skylight windows may be installed in proximity to one another. For example, a single room in a home could include two or three skylight windows along the ceiling thereof. With prior skylight operators, a separate control device is required for each. As such, a separate, for example, wall mounted control must be provided for each so that the windows must be opened or closed separately and independently.

The present invention is intended to overcome one or more of the problems as set forth above.

SUMMARY OF THE INVENTION

In accordance with the present invention, a motorized skylight operator control permits improved commanding of motor operation.

Broadly, there is disclosed herein in accordance with one aspect of the invention a control for a window operator having an electrically controlled drive for moving a window sash relative to a window frame between open and closed positions. The control comprises means for commanding movement of the drive to move the window to any select position between the open and closed positions and developing a command signal having a component representing the select position. Means are provided for sensing actual position of the window between the open and closed positions and developing a feedback signal having a component representing the actual position. A controller is coupled to the commanding means and the sensing means including means for comparing the select position to the actual position and output means coupled to the drive for developing an electrical signal to control the drive responsive to a difference between the select and actual positions to minimize the difference.

It is a feature of the invention that the commanding means comprises a potentiometer connected to the controller and the potentiometer develops the command signal having a level representing the select position.

It is another feature of the invention that the sensing means comprises a sensor for sensing incremental movement of the window.

It is a further feature of the invention that the sensing means comprises a counter having a count value selectively incremented or decremented in response to incremental movement of the window, the count value representing the actual position.

It is still another feature of the invention that the sensing means includes initialization means for periodically controlling operation of the control means to set an initial count value.

It is still another feature of the invention that the comparing means comprises a microcontroller operated in accordance with a control program to develop the electrical signal.

It is still a further feature of the invention that the output means comprises an H-bridge circuit controlled by the microcontroller for controlling polarity of power applied to the drive.

It is an additional feature of the invention to provide second commanding means coupled to the controller for commanding movement of the drive to move the window to either the open or closed position and the controller output means develops the output signal to move the window to the commanded open or closed position in response to such command.

It is still a further feature of the invention that the drive comprises a rotary drive and the sensor comprises a ring magnet driven by the drive and a hall effect sensor in proximity to the ring magnet for sensing rotary movement thereof.

There is disclosed in accordance with another aspect of the invention a control for a window operator having an electrically controlled drive for moving a window sash relative to a window frame between open and closed positions. The control comprises first interface circuit means for connection to a user control device which commands movement of the drive to move the window between the open and closed positions and develops a command signal in response thereto receivable by the first interface circuit and second interface circuit means for connection to a similar second interface circuit of another control for selectively receiving and transmitting a command to move the same or another window, respectively, between the open and closed positions. A controller is coupled to the first and second interface circuit means and includes input receive means for determining if a command is received from one of the first and second interface circuit means, output drive means coupled to the drive for developing an electrical signal to control the drive responsive to a command being received, and output transmit means for transmitting a command to the second interface circuit means for transmission to such other control incident to the command being received from the first interface circuit means.

In accordance with another aspect of the invention the first interface circuit means receives a command signal for commanding movement of the drive to move the window to any select position between the open and closed positions, and the second interface circuit means receives or transmits a command to drive the same or the window to any select position between the open and closed position. Also included are means for sensing actual position of the window between the open and closed positions and developing a feedback signal representing the actual position. The controller further comprises means for comparing a received select position from one of the first and second interface circuit means to the actual position and the output means develops the electrical signal to control the drive responsive to a difference between the received select and actual positions to minimize the difference.

It is a feature of the invention that the command represents a percent of window open between the open and closed positions. It is a further feature of the invention that the second interface circuit means comprises a bidirectional serial channel for selectively receiving or transmitting serial data representing the command to or from the controller.

It is a further feature of the invention that the controller further comprises moisture sensing means for sensing moisture in proximity to the window and override means connected to the moisture sensing means for developing an override command to move the window to a closed position in response to moisture being sensed.

Particularly, the skylight operator includes a chain drive driven by a motor. The polarity of power applied to the motor is controlled to selectively open or close the window. Polarity is controlled by an H-bridge switching circuit driven by a microcontroller. The microcontroller receives commands from any one of a plurality of control devices. The operator includes a feedback circuit using a hall effect sensor in connection with a ring magnet on the motor shaft for sensing incremental movement of the motor, representing movement of the window.

The use of a potentiometer as a control device allows unattended full or partial opening of the window. A user need only turn the potentiometer knob to a desired amount of opening. The microcontroller in response to such a command compares the command to the feedback signal and controls the motor to minimize the difference between the two.

An infrared remote control can open, close or stop the window operator at any intermediate point.

A thermostat input allows connection of a thermostat or other signal pole, single throw contact device to provide full opening or closing of the window.

A rain sensor senses excessive moisture or rain and provides a signal to the microcontroller to close the skylight in response thereto.

A serial communication link is provided to connect plural operators to control multiple windows from a single control device. The serial communication link is provided by daisy chaining serial ports of the operators together with twisted pair wire. The operator with the control inputs connected directly to it operates as the master and transmits data to the slave operators to direct their operation. Alternatively, the concept can be used to control multiple operators on a single window where the operators are all required to run in close synchronization.

Further features and advantages of the invention will readily be apparent from the specification and from the drawings.

DESCRIPTION OF THE INVENTION

Figure 1:
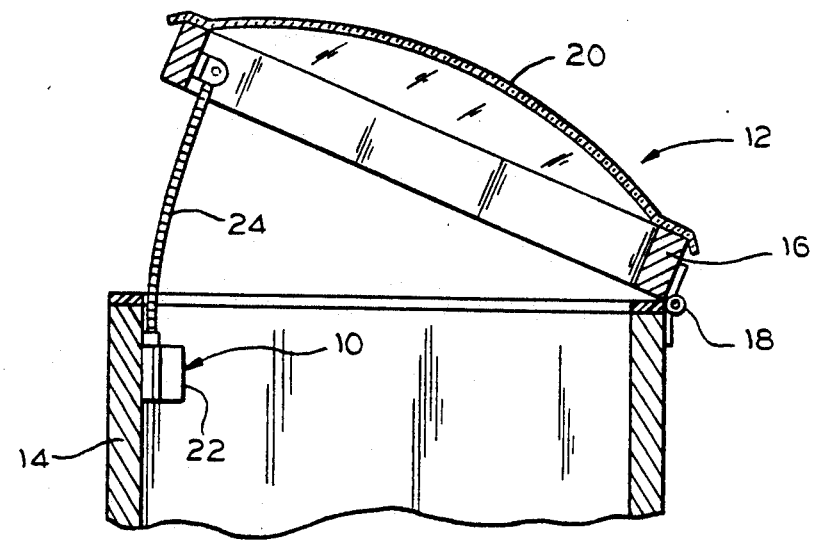
FIG. 1 is a central sectional view of a skylight window including a chain operator according to the invention mounted to the window, with the window in an open position.

A window operator according to the invention, indicated generally at 10 in FIG. 1, is shown mounted for operation of a window and particularly a skylight window 12 having a frame 14 and a sash 16 hinged to the frame 14 with a conventional hinge 18. The sash 16 has a pane in the form of a dome member 20 which transmits light. The window 12 is shown with the sash 16 in the open position. The operator 10 has a number of associated components for opening and closing the window 12. These components include a housing 22 mounted to the frame 14 and a chain 24 connected to the window sash 16 for opening movement of the window 12.

The mechanical operation of the window operator 10 is as shown and described in detail in Tacheny et al. U.S. Pat. No. 4,521,993 and Berner et al. U.S. Pat. No. 4,945,678, both incorporated by reference herein.

The Tacheny et al. patent discloses structure for the chain drive. The Berner et al. patent discloses a motor drive operating the chain drive for opening and closing of a window, with the motor being drivingly connected to a drive output member through an intermediate gear structure. The present invention relates to a control for controlling operation of the motor drive.

Figure 2:
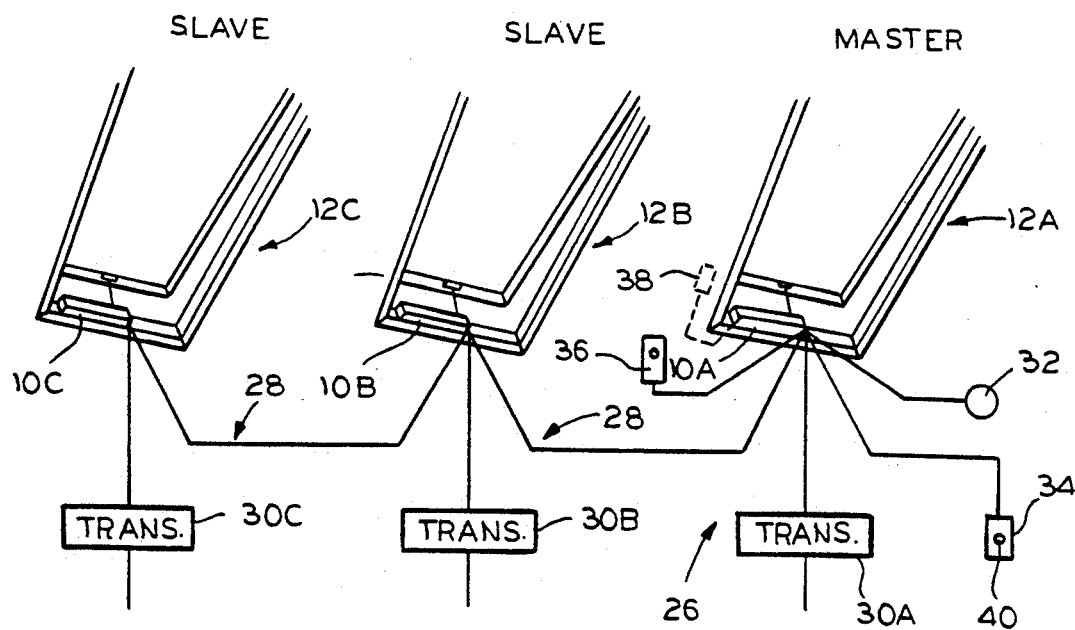
FIG. 2 is a perspective view of a plurality of skylight windows each including a chain operator according to the invention and showing interconnection of control devices therefor in a master and slave configuration.

Referring to FIG. 2, a plurality of skylight windows 12A, 12B and 12Cc are illustrated each including a respective operator 10A, 10B and 10C, in accordance with the invention. As described more specifically below, each of the operators 10A-10C is identical in construction and each are controlled by control devices 26 connected only to the first operator 10A, referred to as a master. The master operator 10A is in turn connected to the other operators 10B and 10C, known as slaves, via a serial communication channel 28. Each operator is referred to with the suffix A, B or C herein when discussing one relative to the others. However, for simplicity, and since each is identical, when discussing an operator generally the suffix is omitted.

Each operator 10A-10C receives power from a connected transformer 30A, 30B and 30C. The transformers 30A-30C are supplied conventional 110 volts AC power and transform the same to approximately 24 volts AC. The master operator 10A is connected to a thermostat 32, a wall switch 34, a remote control receiver 36 and a rain sensor 38.

The thermostat 32 is of conventional construction and comprises a single pull single throw (SPST) contact. The thermostat 32 is used to provide full opening and closing of the windows 12A–12C in accordance with the sensed temperature being above or below a select threshold. Once the windows 12A–12C are opened or closed, the thermostat 32 is ignored until it changes state again. This allows the other control devices to be used.

The wall switch 34 comprises a user controlled rheostat or potentiometer that can be set to a desired percent of opening for the windows 12A–12C. This provides for unattended full or partial opening. For example, if a knob 40 on the wall switch 34 is turned halfway through its rotation, then the windows 12A–12C open halfway.

The remote control receiver 36 is used with an infrared remote control (not shown) that can open, close or stop the window operators 10A–10C at any intermediate point upon depressing and subsequently releasing an open or a close button.

The rain sensor 38 comprises a circuit mounted exteriorly of the windows 12A–12C which is shorted by moisture or rain collecting thereon. The rain sensor 38 is used to close the windows 12A–12C in the presence of excessive moisture or rain. Once closed, the windows 12A–12C remain closed until some other control device is used to reopen the window.

The thermostat input will be ignored while the rain sensor is detecting moisture. The other inputs can cause an opening. However, the window will immediately close if the rain sensor is still detecting moisture.

In accordance with the invention, all of the control devices are connected directly to the master operator 10. The master operator 10A transmits a data byte on the serial channel 28 to the slave operators 10B and 10C for controlling the same to a position identical to that of the master operator 10. Although now shown, the slave operators 10B and 10C could include directly connected rain sensors 38 to provide for independent closing of each separate window 12B and 12C in the event that they are positioned at different locations of the structure and subject to different moisture conditions.

Figure 3:
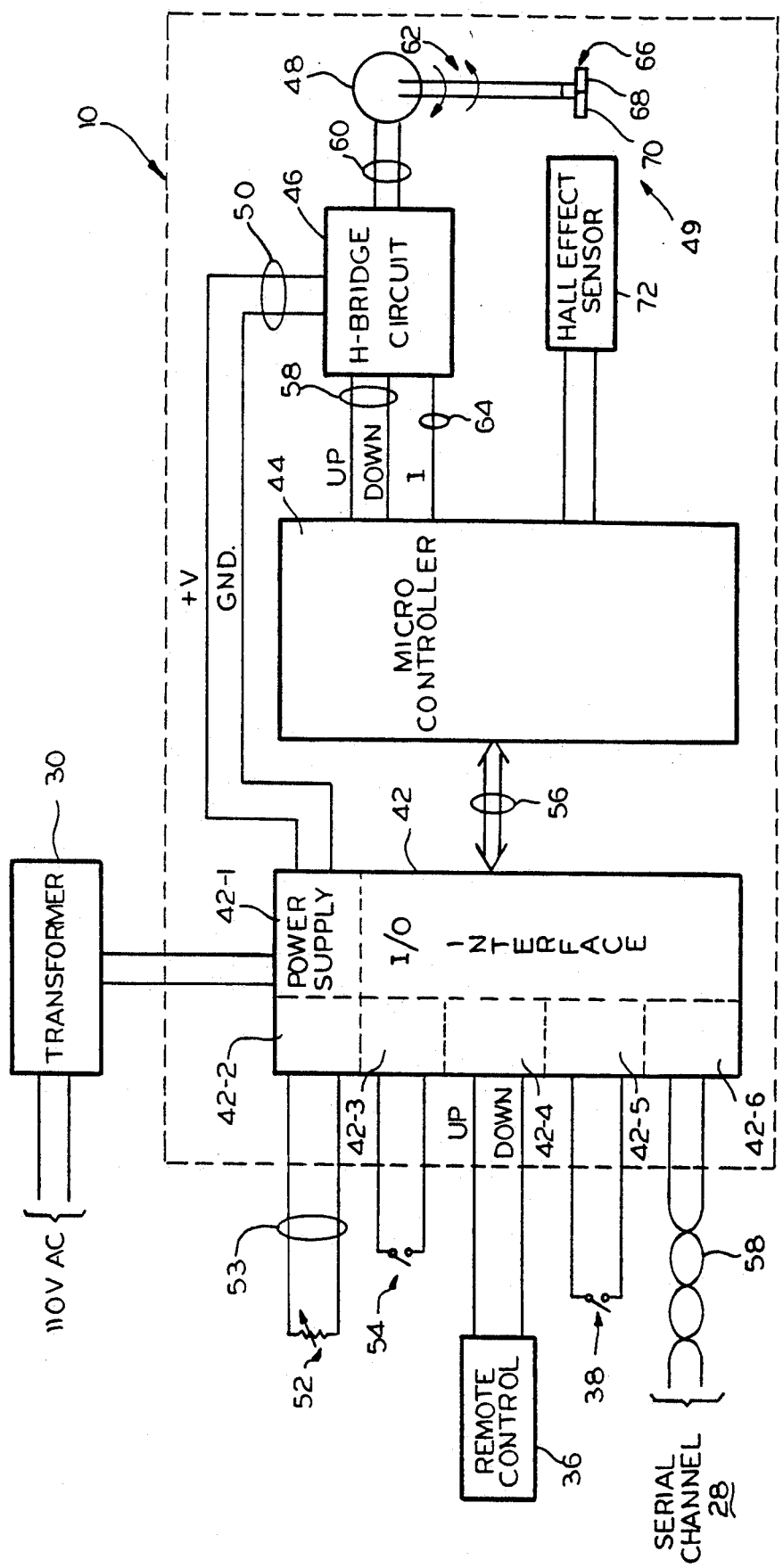
FIG. 3 is a block diagram of a control for each of the skylight operators of FIG. 2.

With reference to FIG. 3, a block diagram representation illustrates control circuit for an operator 10. As described herein, whether the operator 10 is used as a master or slave, as discussed relative to FIG. 2, is determined by the existence of control devices connected thereto. An operator 10 having control devices, such as the thermostat 32 or wall switch 34, is considered a master. An operator 10 not connected to any control devices, but only to the serial channel 28, is considered a slave. Otherwise, the operator is identical in construction.

The operator control includes an I/O interface circuit 42, a microcontroller 44, an H-bridge circuit 46, a drive motor 48 and a position sensor 49.

The I/O interface circuit 42 includes a power supply circuit 42-1 that receives stepped down power from the transformer 30 and develops suitable regulated voltage for powering the other components as well as an unregulated DC voltage on the order of 28 volts DC provided on lines 50 to the H-bridge circuit 46. The DC voltage on the lines 50 is used for powering the motor 48. Also included are interface circuits 42-2, 42-3, 42-4, 42-5 and 42-6 for connection to external devices including a potentiometer 52 via conductors 53, a contact 54 of the thermostat 32, the remote control receiver 36, the rain sensor 38 and the serial channel 28. The interface circuits 42 include suitable components of a conventional nature for adapting the signals provided by the control devices for transferring via plural lines 56 to the microcontroller 44.

The serial channel 28 comprises a twisted pair of wires 58 connected to the microcontroller 44 via the interface circuit 42-6. The potentiometer 52 comprises a variable resistance selectively controlled by rotation of the knob 40. The variable resistance develops a varying voltage across the conductors 53 with the voltage level representing knob position. The I/O Interface circuit 42 senses the variable voltage provides a variable level analog signal to the microcontroller 44 responsive thereto. The rain sensor 38 and thermostat contact 54 provide discrete logic inputs to the microcontroller 44. The remote control 36 provides dual discrete inputs, one for selecting up movement and the other for selecting down movement. The serial channel is used for transferring a serial signal from a master operator to slave operators, the signal representing a desired open position for any and all skylight windows 12 being controlled by connected operators 10. In the illustrated embodiment, the serial signal comprises an eight-bit byte which is transmitted every fifty milliseconds from the master operator and received by any and all slave operators connected thereto. The eight-bits comprises a digital representation of the percent of open for all of the windows 12.

The microcontroller 44 comprises a type 83C550 CMOS single-chip eight-bit microcontroller as sold by Phillips Components-Signetics. The microcontroller 44 contains an internal ROM memory for storing a control program, as well as suitable RAM for temporary data storage, eight-bit ports for connection to external devices, including a serial port for connection to the serial channel 28 and a watchdog timer.

The H-bridge circuit 46 is of conventional construction. It may consist of two N-channel and two P-channel MOS FET's controlled by signals on lines 58 from the microcontroller for controlling polarity of power supplied on the lines 50 to the motor 48. Particularly, power to the H-bridge circuit 46 is received from the lines 50. The H-bridge circuit 46 develops a bipolar output command on lines 60 to the motor 48. As is well know, the H-bridge circuit 46 switches both sides of the power on the line 50, in this case the unregulated 28 volt DC supply. The polarity of power applied to the motor 48 determines the direction of rotation of a motor output shaft 62. The shaft 62 in turn drives the chain 24 via an intermediate gear structure, as discussed above. Current drawn by the H-bridge circuit is sensed and input to the microcontroller 44 on a line 64. This current sense is used by the microcontroller 44 to determine when the window is in the full closed position.

In order to determine actual position of the window 12, a ring magnet 66 is mounted to the motor shaft 62. The ring magnet is of conventional construction and comprises two magnet segments 68 and 70. A hall effect sensor 72 is positioned in close proximity to the ring magnet 66 and senses magnetic changes resulting from changing between north and south poles at intersections of the segments 68 and 70. The hall effect sensor is connected to an interrupt of the microcontroller 44 to sense the motor revolutions of the shaft 62. In the illustrated embodiment of the invention, each revolution may represent, for example, 0.0050 inches of movement of the chain 24 and thus window 12. Thus, during each full revolution of the shaft 62, there are two pulses to the microcontroller 44. These pulses are used by an internal program counter to increment or decrement a count value, depending on direction of window movement. The count value comprises a digital feedback signal in data form, the count value representing the actual window position.

The potentiometer 52 is operated by the knob 40 to command movement of the motor 48 to drive the window to any select position between the open and closed positions. The potentiometer 52 controls an analog command signal on the lines 53. The level of the analog signal represents the select position.

The interface circuit 42-6 connects the serial channel 28 to the microcontroller serial port. The serial port in the microcontroller 44 is bidirectional. Thus, it can transmit data via the serial channel 28 to another operator in the case of a master, or receive data transmitted on the serial channel 28 from another operator in the case of a slave.

With reference to FIGS. 4A–4F, a series of flow charts illustrate operation of the control program stored in the ROM memory of the microcontroller 44. The control program periodically analyzes the inputs from the various control devices, and the serial channel in the case of a slave operator, and controls the output on the lines 58 to the H-bridge circuit, and the output to the serial channel 28 in the case of a master operator, as commanded by the control program.

Figure 4A:
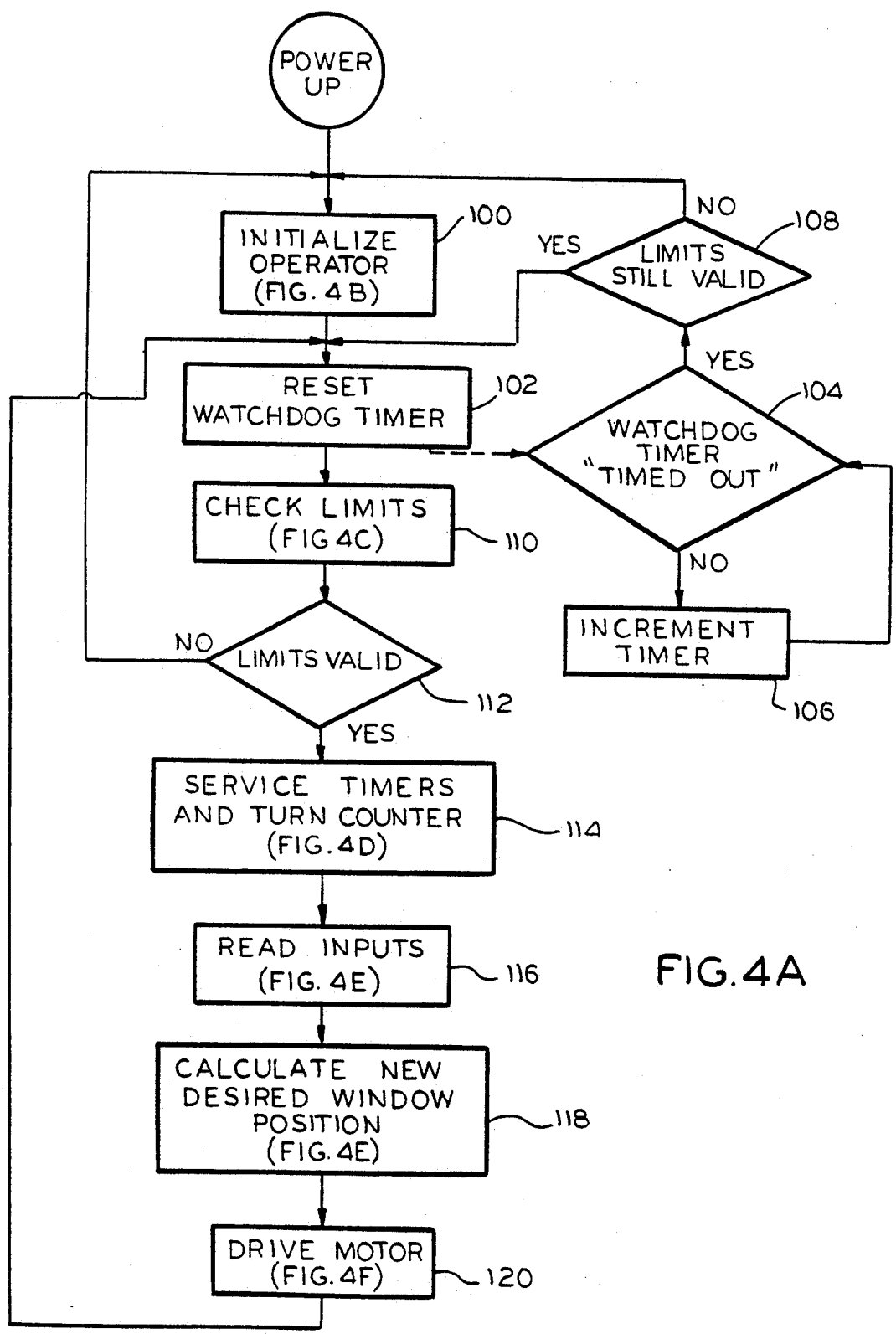
FIGS. 4A-4F comprise flow diagrams illustrating operation of a control program by the microcontroller of FIG. 3 for controlling operation of the operator.

With reference initially to FIG. 4A, a flow diagram for a main program loop is illustrated. Control begins after power-up at a block 100 which comprises an initialize operator subroutine discussed below relative to the flow chart of FIG. 4B. This routine determines length of the chain 24, see FIG. 1. Thereafter, the internal watchdog timer is reset at a block 102. As illustrated, a watchdog timer operation continues in parallel with the main program at a decision block 104 which determines if a the watchdog timer is timed out. This occurs if the timer value is greater than one. If not, then the watchdog timer is incremented at a block 106 and then loops back to the decision block 104. This operation continues unless the watchdog timer times out by not being reset once each cycle at the block 102 in which case control advances to a decision block 108 which determines if program limits, discussed below, are still valid. If not, then control returns to the block 100 to reinitialize the operator. If the limits are still valid, then control returns to the block 102 to reset the watchdog timer.

From the block 102, control proceeds to a check limits routine at a block 110. This routine is discussed below relative to FIG. 4C. A decision block 112 then determines if the checked limits are valid. If not, then control returns to the block 100 to reinitialize the operator. If the limits are valid, then control advances to a block 114 which implements a service timer and turn counter routine discussed below relative to FIG. 4D. Thereafter, the inputs are read at a block 116 and a new desired window position is calculated at a block 118. Both of these functions comprise a subroutine discussed below relative to FIG. 4E. Finally, at a block 120 an output to drive the motor 48 is implemented as specifically shown in the flow chart of FIG. 4F. Thereafter, control returns to the block 102 to begin another program cycle.

Figure 4B:
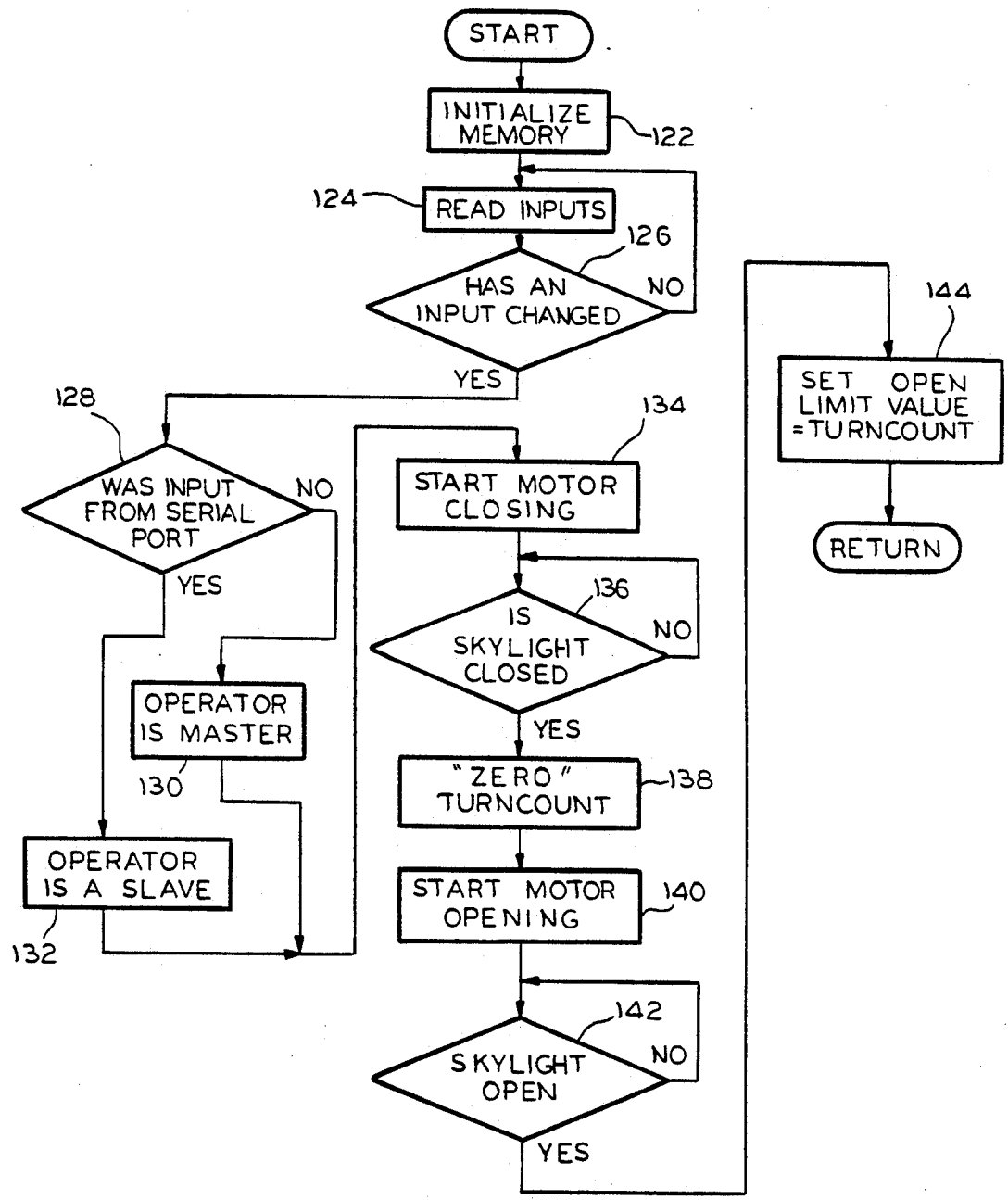

With reference to FIG. 4B, a flow diagram illustrates operation of the initialize operator routine, discussed above, at the block 100. This routine begins at a block 122 which initializes the internal memory for subsequent operation. Normally, this occurs after power-up and is used to reset the memory to a suitable beginning condition. The inputs from the I/O interface circuit 42 are read at a block 124 and a decision block 126 determines if any input has changed. If not, then control returns to the block 124. This is done so that initialization does not actually occur until such time as a user has commanded a change in window position. Because the initialization routine requires controlled movement of the window, it is preferred that it not be done except when some movement is commanded by a user.

If an input has changed, as determined at the decision block 126, then a decision block 128 determines if the input is from the serial channel 28. If not, then the input is from another control device and the determination is made at a block 130 that the operator is a master. If the input was from the serial block, then at a block 132 determination is made that the operator is a slave.

Because the actual position of the window 12, i.e., the chain length, is represented by a stored count value, it is necessary to scale the counter to the input from the potentiometer 52. To do so it is necessary to move the window its full range between open and closed positions. Beginning at a block 134 a command is set on the lines 58 to the H-Bridge circuit 46 to drive the motor 48 to close the window 12. A decision block 136 then loops upon itself until the window 12 is closed. This decision is based on sensing the current sense input on the line 64. Once the window is fully closed, the motor 48 draws excess current. Control then advances to a block 138 which sets a count value of a counter labelled TURNCOUNT to zero. Thereafter at a block 140 the motor 48 is operated to open the window 12 as by controlling the signals on the line 58 to the H-bridge circuit to drive the motor 48 to lift the window 12. A decision block 142 loops upon itself until the skylight window 12 is open. As long as counts are received, then it is assumed that the skylight is still opening. Once no further counts are received, then the skylight is assumed open. During the time when the window is opening, the TURNCOUNT count value is incremented with each count from the hall effect sensor 72. An open limit value is set equal to the TURNCOUNT count value at a block 144 and the routine then ends and returns to the main loop. The open limit value is used during opening operations to indicate the 100% open position.

Figures 4C, 4D:
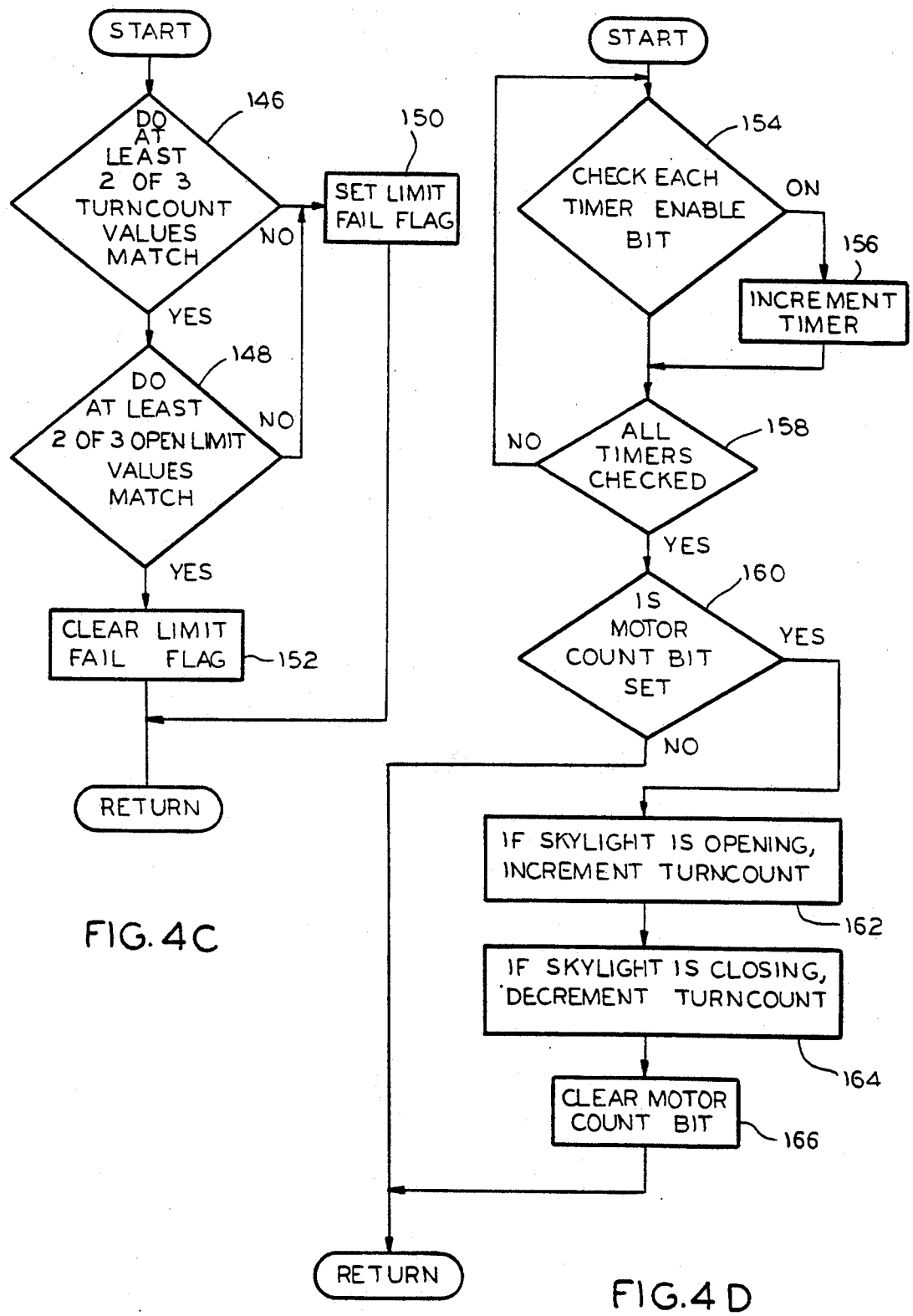

With reference to FIG. 4C, a flow diagram illustrates operation of the check limits subroutine of block 110, see FIG. 4A. In memory the TURNCOUNT count value and the open limit value are stored in three separate locations. The check limits routine verifies that memory has not been corrupted as by verifying that at least two of the three stored values match. This routine begins at a decision block 146 which determines if at least two of three TURNCOUNT values match. Similarly, at a decision block 148 a determination is made that at least two of the three open limit values match. If either test fails then a limit fail flag is set at a block 150. If both are satisfied, then the limit fail flag is cleared at a block 152 and from either the routine ends.

With reference to FIG. 4D, a flow diagram illustrates operation of the service timers and turn counters routine 114 of FIG. 4A. This routine begins at a decision block 154 which checks the enable bit for one of the internal timers. If a timer enable bit is on, then the timer is incremented at a block 156. Next, or if the timer enable bit is off, then a decision block 158 determines if all timers have been checked. If not, then control returns to the decision block 154 for the next timer. This is done so that once during each operation of the main program all enabled timers are incremented. Once all timers are checked, then a decision block 160 determines if a motor count bit is set. The motor count bit is set when an interrupt is received from the hall effect sensor. If this bit is set, then at a block 162 the TURNCOUNT register is incremented if the skylight is opening or at a block 164 the TURNCOUNT register is decremented if the skylight is closing. Thereafter, the motor count bit is cleared at a block 166. From the block 166 or if the motor count bit was not set as determined at the decision block 160, then the routine ends.

Figure 4E:
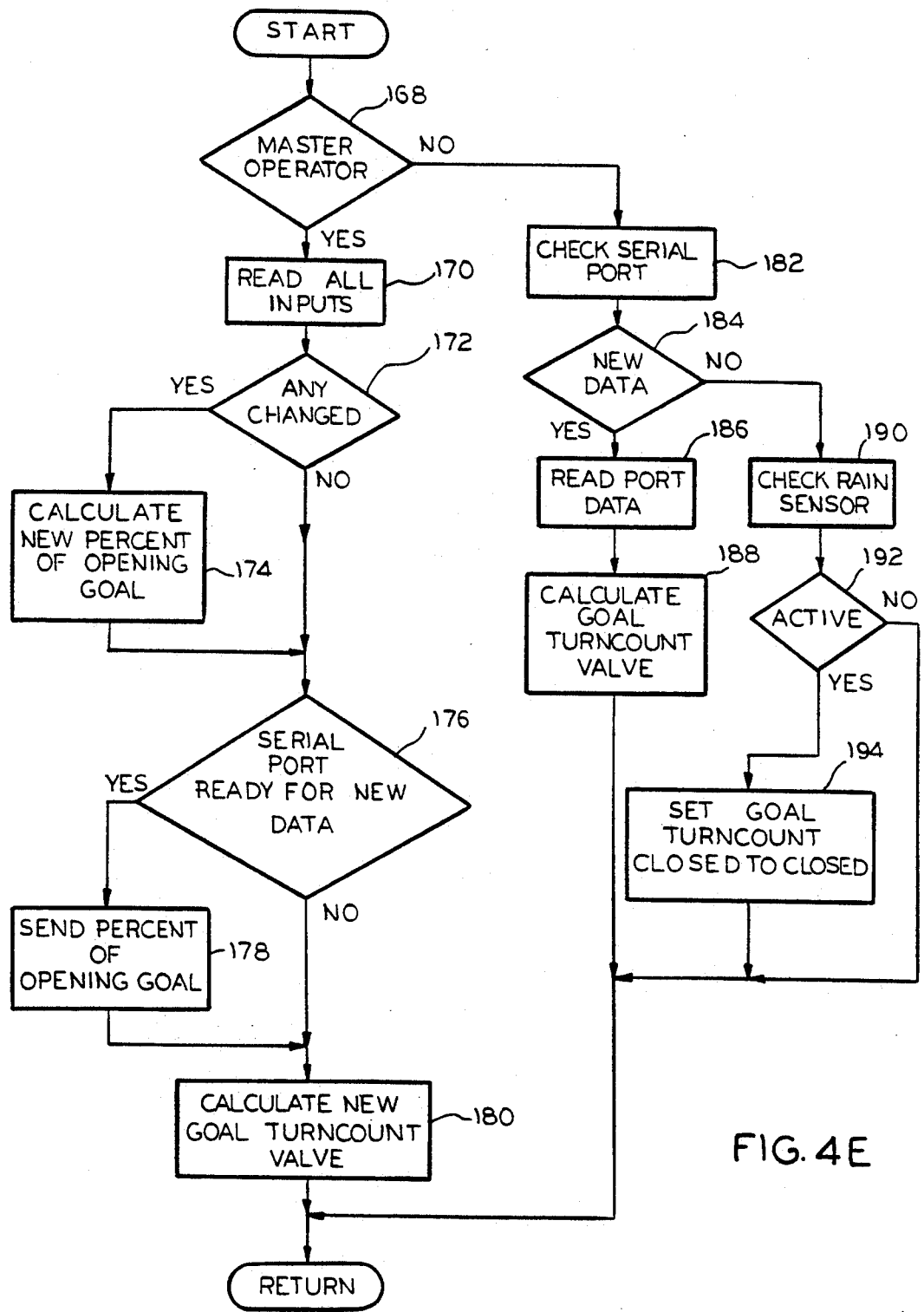

With reference to FIG. 4E, a flow diagram illustrates the program for implementing the read inputs routine 116 and calculate new desired window position routine 118 of FIG. 4A. The routine begins at a decision block 168 which determines if the operator is the master operator. This decision is based on the designation made at the block 130 or 132 of FIG. 4B. If the operator is a master, then control advances to a block 170 which reads all of the inputs. These inputs include those from the potentiometer 52, the remote control receiver 36, the rain sensor 38 and the thermostat contact 54. A decision block 172 determines if any have changed and, if so, a new percent of opening goal is calculated at a block 174. This goal depends upon which input devices change. For example, with the potentiometer 52, the goal equals the resistance level set on the potentiometer relative to the span of the same. For the remaining devices the percent relates to either zero percent indicating full closure or one hundred percent indicating full opening. Thereafter, or if no input has changed, then control advances to a decision block 176 which determines if the serial port is ready for new data. Particularly, the serial port is updated approximately once every fifty milliseconds. If the port is ready for new data, then the percent of opening goal is transferred to the serial channel 28 at a block 178 for transmission to the slave operators. Thereafter, or if the serial port is not ready, then the new goal TURNCOUNT value is calculated at a block 180. This is a TURNCOUNT value scaled to the percent of opening goal so that it can be compared to the actual TURNCOUNT to control motor operation. Thereafter the routine ends.

Returning to the decision block 168, if the operator is not a master operator, indicating that it is a slave operator, then control advances to a block 182 which checks the serial port. As discussed above, the slave operator receives control commands only from the serial port, with the possible exception of a rain sensor. A decision block 184 determines if new data has been received. If so, then the data is read at a block 186. This data would represent the percent of opening goal transmitted by the master operator. Thereafter, the goal TURNCOUNT value scaled to the percent of opening goal is calculated at a block 188 and the routine ends. If no new data is received at the decision block 184, then the rain sensor is checked at a block 190. A decision block 192 determines if the rain sensor is active. A rain sensor is active if it is both present and shorted by moisture. If not, then the routine ends. If so, then the goal TURNCOUNT is set to equal that of the closed position at a block 194 and the routine ends.

Figure 4F:
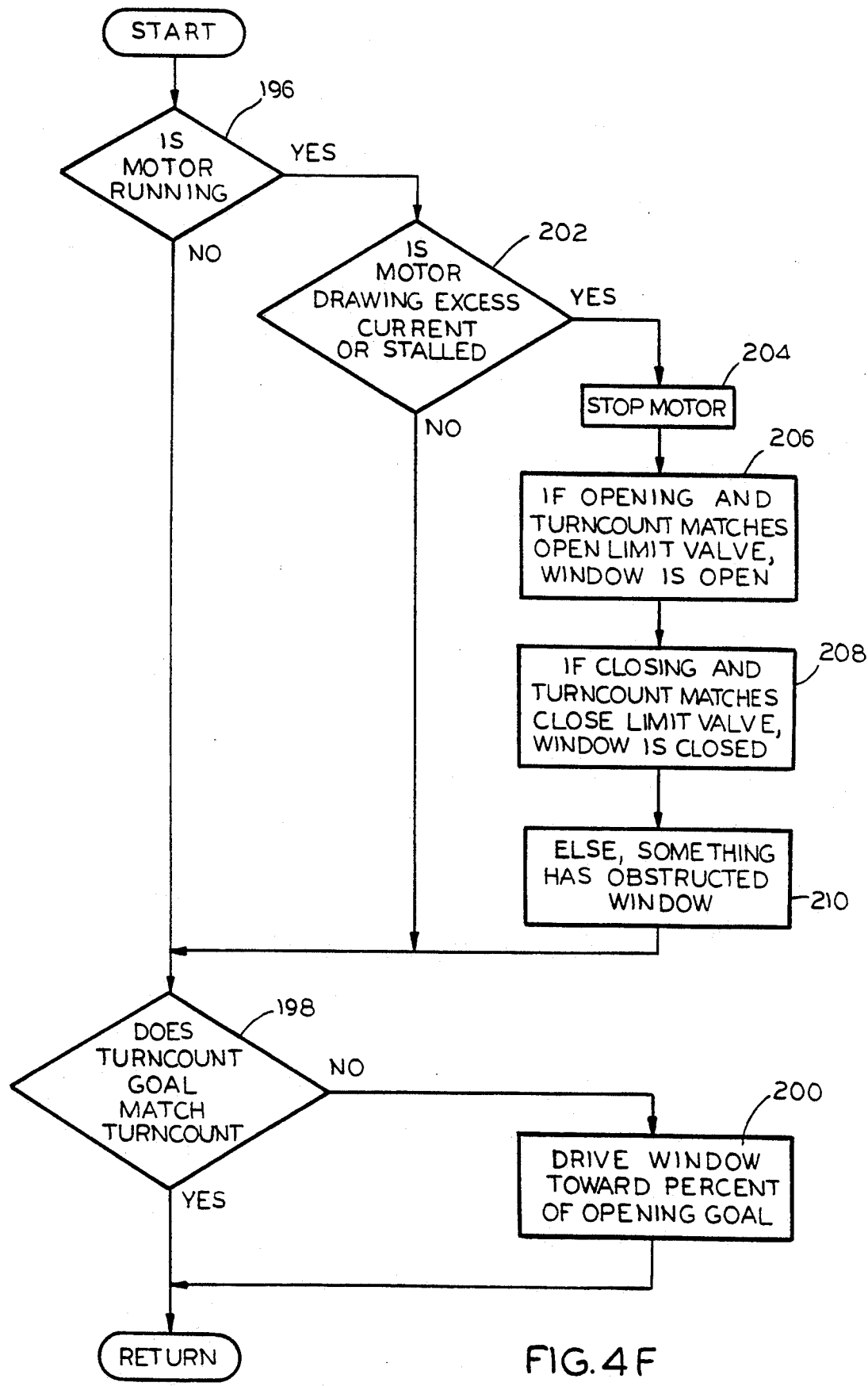

With reference to FIG. 4F, a flow diagram illustrates operation of the drive motor routine of block 120, see FIG. 4A. This routine begins at a decision block 196 which determines if the motor is running. If not, then a decision block 198 determines if the goal TURNCOUNT value matches the actual TURNCOUNT count value. If so, then there is no need to drive the motor and the routine ends. If the goal TURNCOUNT value does not match the actual TURNCOUNT count value, then at a block 200 the motor 48 is operated to drive the window 12 toward the percent of opening goal related to the goal TURNCOUNT value. Particularly, if the window needs to be opened more, then the up line to the H-bridge circuit 46 is activated, while if the window needs to be closed more, then the down line is activated to drive the window closed. Thereafter, the routine ends.

If the motor 48 is running, as determined at the decision block 196, then a decision block 202 determines if the motor is drawing excess current or is stalled. The excess current condition is based on the current feedback signal on the line 64. The stalled condition is sensed by the lack of a count input from the hall effect sensor. If neither condition exists, then control advances to the decision block 198 to continue normal operation. If one of the conditions exists, then the motor is stopped at a block 204. The basis for stopping the motor can be one of three conditions. Namely, the window is open, the window is closed or it is obstructed. If the window is opening and the TURNCOUNT count value matches the open limit value, then it is assumed that the window is open at a block 206. If the window is closing and the TURNCOUNT value matches the close limit or zero value, then the window is assumed closed at a block 208. If neither, then the window is assumed to have been obstructed at a block 210. Thereafter, control returns to the decision block 198.

Summarizing, in accordance with one aspect of the invention, the window operator control includes a control device, such as the thermostat 32, wall switch 34, remote sensor 36 or rain sensor 38 for commanding movement of the drive to move the window to any select position between the open and closed positions and to develop a command signal having a component representing the select position. The ring magnet 66 in conjunction with the hall effect sensor 72 senses actual position of the window between the open and closed position and controls a microcontroller count value representing the actual position. The microcontroller 44 is coupled to the control devices and the hall effect sensor 72 and it compares the select position representing by a goal TURNCOUNT value to the actual position represented by the actual TURNCOUNT count value and outputs a control to the H-bridge circuit 46 for developing an electrical signal to control the motor 48 to drive the window sash 16 relative to the window frame 14 responsive to a difference between the select and actual positions to minimize the difference.

In accordance with another aspect of the invention, the control includes first interface circuits 42-2 to 42-5 for connection to the user control devices which command movement of the drive to move the window 12 between the open and closed positions and develop a command signal receivable by the connected first interface circuit. A second interface circuit 42-6 is provided for connection to a similar second interface circuit of another control for receiving or transmitting a command to move the same or another window 12, respectively, between the open and closed positions. The microcontroller 44 is coupled to the interface circuits 42 and determines if a command is received from one of the first and second interface circuits and derives the H-bridge circuit 46 to develop an electrical signal to control the motor 48 responsive to a command being received and transmits a command to the second interface circuit 42-6 for transmission to such other control incident to the command being received from the first interface circuit.

The embodiment of the invention described and illustrated herein is illustrative of the broad inventive concepts comprehended hereby.

We claim:

1. A control for a window operator having an electrically controlled drive for moving a window sash relative to a window frame between open and closed positions, comprising:

first interface circuit means for connection to a user control device which commands movement of the drive to move the window between the open and closed positions and develops a command signal in response thereto receivable by the first interface circuit;

second interface circuit means for connection to a similar second interface circuit means of another control for selectively receiving or transmitting a command to move the same or another window, respectively, between the open and closed positions; and a controller coupled to said first and second interface circuit means and including input receive means for determining if a command is received from one of said first and second interface circuit means, output drive means coupled to said drive for developing an electrical signal to control said drive responsive to a command being received, and output transmit means for transmitting a command to said second interface circuit means for transmission to such other control incident to the command being received from said first interface circuit means.

2. The control of claim 1 wherein said first interface circuit means receives a command signal for commanding movement of the drive to move the window to any select position between the open and closed positions, and said second interface circuit means receives or transmits a command to drive the same or the other window to any select position between the open and closed positions and further comprising means for sensing actual position of the window between the open and closed positions and developing a feedback signal representing said actual position, and wherein said controller further comprises means for comparing a received select position from one of said first and second interface circuit means to said actual position and said output means develops said electrical signal to control said drive responsive to a difference between said received select and actual positions to minimize said difference.

3. The control of claim 2 wherein said command represents percent of window open between the open and closed positions.

4. The control of claim 1 wherein said second interface circuit means comprises a bidirectional serial channel for selectively receiving or transmitting serial data representing a command to or from said controller.

5. The control of claim 1 wherein said controller further comprises moisture sensing means for sensing moisture in proximity to the window and override means connected to said moisture sensing means for developing an override command to move the window to a closed position in response to moisture being sensed.

* * * * *